United States Patent
Martin et al.

(10) Patent No.: US 7,907,299 B2
(45) Date of Patent: Mar. 15, 2011

(54) METHOD AND SERVER FOR PROCESSING AN ELECTRONIC WORKFLOW

(75) Inventors: Nathaniel G. Martin, Rochester, NY (US); John C. Handley, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1091 days.

(21) Appl. No.: 11/303,316

(22) Filed: Dec. 16, 2005

(65) Prior Publication Data
US 2007/0139692 A1 Jun. 21, 2007

(51) Int. Cl.
*G06F 3/12* (2006.01)
(52) U.S. Cl. ...................................................... 358/1.15
(58) Field of Classification Search .................. 358/1.15, 358/1.9; 270/52.02, 58.01, 59, 58.31, 1.01, 270/1.02, 4, 8, 9, 5.02, 5.03, 20.1, 21.1, 1.03, 270/37, 53.02, 58.11, 58.18, 34
See application file for complete search history.

(56) References Cited

U.S. PATENT DOCUMENTS

| | | | | |
|---|---|---|---|---|
| 6,873,426 | B1* | 3/2005 | Farrell | 358/1.15 |
| 7,180,615 | B2* | 2/2007 | Price et al. | 358/1.15 |
| 2005/0195447 | A1 | 9/2005 | Os | |
| 2005/0213132 | A1* | 9/2005 | Uejo | 358/1.13 |
| 2006/0039707 | A1* | 2/2006 | Mima | 399/23 |

* cited by examiner

*Primary Examiner* — Benny Q Tieu
*Assistant Examiner* — Ngon Nguyen
(74) *Attorney, Agent, or Firm* — Carter, DeLuca, Farrell & Schmidt, LLP

(57) ABSTRACT

A method and server is provided for processing an electronic workflow for implementation by at least one machine. The method includes processing an electronic workflow having at least one machine readable job request; determining that human intervention is needed for processing one of the machine readable job requests; reformatting the machine readable job request into a human readable format; and providing the job request reformatted in a human readable format to an output device for outputting the job request reformatted in a human readable format as human readable output.

17 Claims, 2 Drawing Sheets

METHOD AND SERVER FOR PROCESSING AN ELECTRONIC WORKFLOW

BACKGROUND

This disclosure relates generally to a method and server for processing an electronic workflow, and more particularly to a method and server for facilitating human intervention as needed during implementation of the workflow.

In a workflow, a job is produced by an assortment of machines, where the machines may be setup in a workshop. Each machine may perform a different task, with a variety of tasks contributing to production of a job. The discussion below is directed to print shops and print workflows for illustrative purposes, however the discussion below pertains to workshops and workflows in general. Print shops contain several types of machinery whose functions are combined for performance of a workflow for producing a job.

An example of a print workflow is bounding a book. In a first task of the print workflow, the print shop prints a book block containing text of the book on paper in black and white. In a second task of the print workflow, the print shop produces a cover on card stock in color. In a third task of the print workflow, the print shop binds the cover to the block using a binding machine. In a fourth task of the print workflow, the print shop trims the book to size using a trimmer. Each machine used for performing the tasks described above has many associated parameters that are set for performance of the job.

Traditionally, print shops produce a job based on paper job requests, also known as paper job tickets, which provide instructions for performance of tasks of the job. An operator reads the instructions on the paper job request and sets the machines in the shop as specified by the instructions on the paper job request. The operator may also mark the paper job request to indicate completion of a task. The paper job request moves with the elements produced by the job, providing a paper artifact displaying the state of the job, the machines used, and parameters that are set before performing a task.

The traditional approach to running a print shop is costly and slow, requiring human intervention at every step of the process. As a result, it is inefficient to print small batches of printed material, since setting up the machines consumes considerable time and expense. The time and expensed consumed for production of a small batch of printed material may be amortized against a large batch of printed materials.

In order to reduce the time and expense consumed by the traditional method of operating a print shop, and to decrease the size of economically viable press runs, the industry has developed methods for setting machine parameters electronically and controlling print shop machinery using electronic job requests. Job Definition Format (JDF) is a popular language used for electronic job requests in which the machines to be used and parameter settings are specified. JDF provides a machine readable format for the traditional paper job request so that the machines can be controlled and have their parameters set by computers.

Currently operating print shops typically have large investments in existing equipment not capable of processing electronic job requests. In a print shop where some, but not all, of the machines are capable of processing electronic job requests, the print shop may use a combination of traditional paper job requests for allowing a human operator to set the machine parameters, and electronic job requests for allowing a computer to control and set the equipment.

However, integration of electronic job requests and paper job requests for various jobs of a workflow is lacking.

In one prior art method, materials, machines and operators involved in running a workflow each have an associated code, e.g., a barcode provided on a tag or badge. The operator performing a job scans the materials and machines used and his own badge for recording which operator, materials and machines were used for performance of a job. However, the method does not provide for the machinery and operator to receive instructions with parameters of the job, or for the operator to provide feedback related to the job.

SUMMARY

Accordingly, it is an aspect of the present disclosure to provide a method for processing an electronic workflow for implementation by at least one machine. The method includes processing an electronic workflow having at least one machine readable job request; determining that human intervention is needed for processing one of the machine readable job requests; reformatting the machine readable job request into a human readable format; and providing the job request reformatted in a human readable format to an output device for outputting the job request reformatted in a human readable format as human readable output.

In accordance with a further aspect of the present disclosure, there is provided a print workflow server for processing an electronic print workflow for implementation by at least one machine. The print workflow server includes a processor assembly for executing application software for processing the electronic print workflow having at least one machine readable job request. The print workflow server further includes a module executable by the processor assembly for determining that human intervention is needed for processing one of the machine readable job requests. Additionally, the print workflow server includes a module executable by the processor assembly for reformatting the machine readable job request into a human readable format; and a module executable by the processor assembly for providing the job request reformatted in a human readable format to an output device for outputting the job request reformatted in a human readable format as human readable output.

Pursuant to another aspect of the present disclosure, there is provided a method for processing an electronic workflow for implementation by at least one machine. The method includes processing an electronic workflow having at least one machine readable job request; reformatting a machine readable job request into a human readable format, including converting the machine readable job request into a printer ready formatted job request including human readable characters; providing the job request reformatted in a human readable format to a printing device for printing the reformatted job request; receiving a machine readable version of the printed job request after it was modified by a user independently of the workshop equipment; and integrating the modification to the printed job request into the electronic workflow.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

A workflow production system is provided which uses paper job requests, also known as paper job tickets, which are readable both by a human operator and by a computer. Specifications for the performance of tasks of a workflow that need to be performed by machines and a human operator operating the machines are printed on a paper job request together with additional machine readable markings. The human operator performs the tasks, e.g., setting machine parameters, as specified on the paper job request, and marks the paper job request, as in a traditional work flow, with indications of the state of the task. The marked paper job request is scanned by a scanning device and the machine readable markings are interpreted by a workflow server managing the electronic job request. The marks made by the human operator are also interpreted by the workflow server, providing feedback information regarding the current status of the workflow to the workflow server. The workflow continues under the control of the workflow server, including using electronic job requests and/or paper job requests.

In another embodiment of the disclosure the tasks requiring human intervention are displayed on a display device, e.g., of a handheld computing device, instead of using paper job requests. The workflow server recognizes when a task to be performed requires human intervention and generates a job request that is displayable on the display device and readable by the human operator. The human operator may enter feedback information via the handheld computing device which is used by the workflow server in controlling the workflow.

Figure 1:
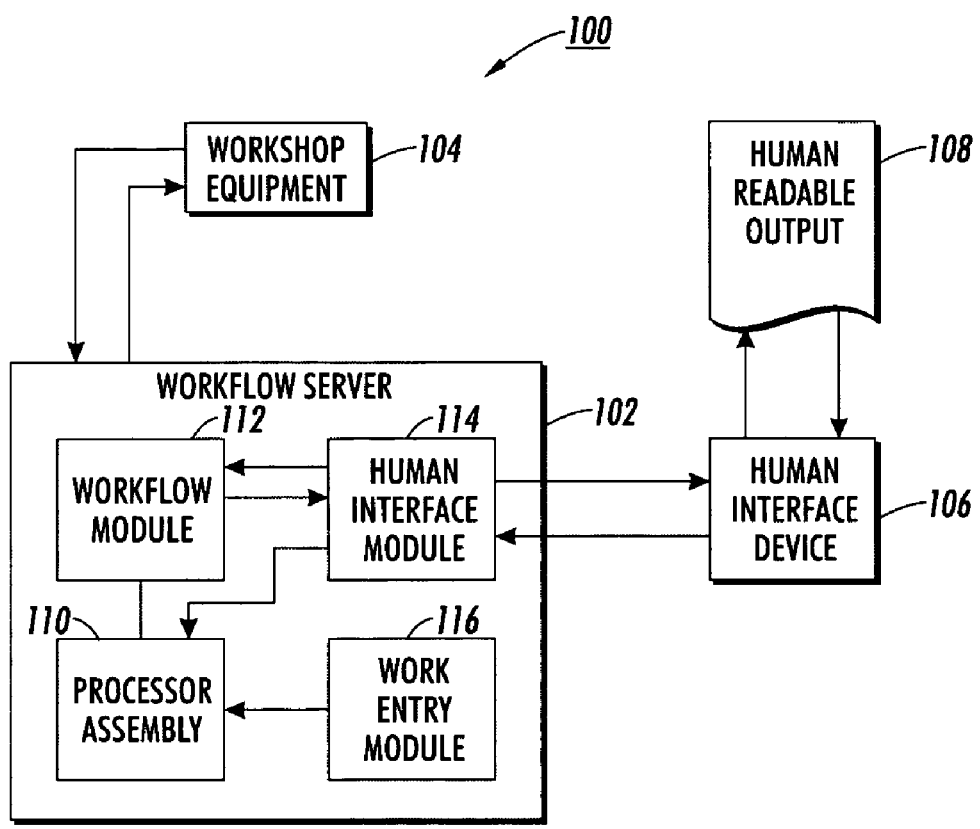
FIG. 1 is a block diagram of an exemplary workflow production system in accordance with the present disclosure.

For a general understanding of the features of the present disclosure, reference is made to the drawings. In the drawings, like reference numerals have been used throughout to identify identical elements. With initial reference to FIG. 1, an exemplary workflow production system in accordance with the present disclosure is illustrated and is designated generally as workflow production system 100. Workflow production system 100 includes workflow server 102, workshop equipment 104 and human interface device (HID) 106.

The workflow server 102 is capable of executing application software for interacting with the workshop equipment 104 to control the workshop equipment 104 for handling a workflow and to monitor the workflow and the workshop equipment 104. In addition, the workflow server 102 is capable of executing application software for interacting with human operators of the workshop equipment via the HID 106.

The workshop equipment 104 includes one or more machines, where each machine performs at least one job of a workflow for achieving a desired outcome. In the present disclosure the workshop equipment 104 is described as print shop equipment, where each machine of at least one machine of the print shop equipment performs at least one job for producing a printed output. Machines that may be included in the workshop equipment include, for example, at least one digital printer, offset printer, a computer having access to stored information, etc.

Some of the machines or all of the machines may be capable of handling electronic job requests that provide instructions and/or parameters to the respective machine for instructing a machine to perform a job and/or how to perform the job. Additionally, some or all of the machines may be capable of providing feedback to the workflow server 102 indicating when human intervention is needed for performing a job specified in a received electronic job request.

The word "printer" as used herein encompasses any apparatus or system, such as a digital copier, xerographic printing system, reprographic printing system, bookmaking machine, facsimile machine, multifunction machine, etc., which performs a print outputting function for any purpose.

Workflow server 102 includes a processor assembly 110 having at least one processor and storage device, workflow module 112, human interface module 114, and a work entry module 116. The work entry module 116 receives work request information which may be user entered, such as via a user input device (UID) or which may be provided by another processing device via a communication device in operative communication with the another processing device and the work entry module 116. The work request information describes the work that needs to be done for a particular workflow.

Each module of the workflow module 112 and the human interface module 114 is a software module including a series of programmable instructions capable of being executed by the processor assembly 110. The series of programmable instructions can be stored on a computer-readable medium, such as RAM, a hard drive, CD, smart card, 3.5" diskette, etc., or transmitted via propagated signals for being executed by the processor assembly 110 for performing the functions disclosed herein and to achieve a technical effect in accordance with the disclosure. The functions of the respective software modules may be combined into one module or distributed among a different combination of modules.

The workflow module 112 includes a set of programmable instructions capable of being executed by the processor assembly 110 for receiving workflow instructions via the work entry module 116, and for generating a corresponding electronic workflow including electronic machine readable job requests that are provided to the workshop equipment 104 for controlling the workshop equipment 104 to perform jobs of the workflow. The controlling of the workshop equipment 104 may include setting up and operating the machinery. The electronic job requests may be provided, for example, in job definition format (JDF), which is an extensible markup language (XML) based format for workflow and control information. Those skilled in the art will be familiar with prior art modules for generating electronic job requests.

Additionally the workflow module 112 includes a set of programmable instructions capable of being executed by the processor assembly 110 for recognizing when a job to be performed by the workshop equipment 104 as per electronic job request instructions provided by the workflow module 112 requires human intervention, e.g., human action, input and/or feedback. The recognizing the need for human intervention may include receiving feedback information from the workshop equipment 104. The feedback information may influence subsequent operations by the workflow module 112. Additionally, the recognizing the need for human intervention may be via interpretation of a job request being transmitted to a machine. When the workflow module 112 recognizes that human intervention is required for performance of a job request, the machine readable job request is provided to the human interface module 114. The information provided to the human interface module 114 may include appropriate parameters for setting up and/or operating the machinery and/or handling elements being operated on by the machinery.

The human interface module 114 includes a set of programmable instructions capable of being executed by the processor assembly 110 for converting the machine readable job request into a format that can be output in a human readable form. The converted machine readable job request is provided to HID 106. The human interface module 114 may use XML through an extensible stylesheet language transformation (XSLT) for transforming the machine readable job request into a printable or displayable form having a desired presentation.

The HID 106 includes one or more output devices, such as a printer, display device and/or speaker, for receiving information from the human interface module 114 in machine readable form and providing corresponding output 108 in human readable format that is intelligible to the human operators, e.g., in printed, displayed and/or audio form. Additionally, the HID 106 includes one or more input devices capable of receiving user input information provided by a human operator including feedback information responsive to the output 108 and/or for monitoring the workshop equipment 104 and/or the status of the workflow process. The HID 106 converts the user input information into corresponding signals that are machine readable, and provides the machine readable signals corresponding to the user input information to the human interface module 114. Examples of input devices include a scanner or a user input device, such as a keyboard, mouse or touch screen that interacts with a graphical user interface (GUI) displayed on the display device.

In one embodiment of the disclosure, the human interface module 114 provides the machine readable job request to the HID 106 in a display ready format. The HID 106 may include, for example, a handheld computing device, such as a personal digital assistant (PDA) that may be held by a human operator. The HID 106 includes a display device for displaying output information provided by the human interface module 114 via a GUI in human readable form. The output 108 which is displayed by the display device includes a human readable form of the job request. The HID 106 further includes a UID (keypad, touch screen, etc.) for accepting user input information entered via human operator actions. The human operator actions are converted into signals that are machine readable. The machine readable user input information is provided to the human interface module 114 which extracts entered user input information.

In another embodiment of the disclosure, the human interface module 114 provides the machine readable job request to the HID 106 in a printer ready format. The HID 106 includes a printer and a scanner. The output 108 which is printed by the printer includes a human readable form which functions as a paper ticket for the job request on which process steps can be checked off as they are completed. The output 108 is thus modifiable by human actions, allowing a human operator to input feedback information. The modified printed output 108 is input to the scanner. The scanner scans the modified printer output 108, which includes converting the modified printer output 108 into machine readable form.

In one embodiment of the disclosure, once the modified output 108 is scanned in, it is processed by optical character recognition (OCR) software, which may be included with the HID 106 or the human interface module 114 or provided as a separate module. The OCR software recognizes scanned in characters, including characters included in the electronic job request and/or characters entered by a human operator when modifying the output 108.

In another embodiment of the disclosure, the output 108 is printed as a form providing a user interface (UI) that includes human readable and machine readable information. In one embodiment of the disclosure, the form is a hybrid form having human readable instructions for directing a human operator to enter user input information in a specified location on the form, and at least one printable machine readable optical code specifying the locations on the form where user input information is to be entered. The machine readable optical code may be dense enough to specify the locations, yet not detract from the human readability of the form, such as a prior art optical code having a combination of forward and backward oriented slashes that are known to carry a dense amount of information without distracting the human eye. The form may use other prior art machine readable optical codes, such as barcodes or two-dimensional optical codes, or codes that have not yet been developed.

The human readable information instructs or delineates for a human operator where to make a mark on the form, such as by providing checkboxes on the form. The operator may check off the checkbox, such as for indicating completion of a job of the workflow, or enter information (e.g., status information) at the indicated locations. Accordingly, a human operator using the form may enter feedback information by entering marks on the form in appropriate locations.

The modified form is scanned in by the HID 106 and provided to the human interface module 114. The human interface module 114 interprets the UI of the form, such as by decoding the machine readable information for determining locations on the form that may be checked by marks entered by a human operator. The human interface module 114 checks the indicated locations for user entered marks for extracting user input information. Since the scanner of the HID 106 may generate an image of the modified form, extracting the user input information by the human interface module 114 may include extracting non-image data from the image.

Additionally, it may be desirable for the form to be arranged for the entry of variable information on the form during performance of the workflow before the form is scanned in. Variable information for entry on the form may be related to a job of the workflow performed in association with human intervention including, for example, temporal information (e.g., time and/or date job completed), a number of items produced or used (e.g., the number of copies of a document printed, or the number of copies of a document inserted in an envelope). The variable information may be entered by a human operator (typically by hand, e.g., hand written or stamped) or a device operating independently of the workflow equipment 104. The entered variable information is scanned in with the form, and is in machine readable format or is converted to machine readable format. When the variable information is hand written, OCR is performed for converting the hand written variable information into machine readable form. OCR may be limited for converting hand written characters into machine readable form. Accordingly, the hand written variable information may be written in a machine friendly fashion, such as a style used for handheld computing devices, e.g., a where character recognition is performed using Graffiti™ software.

The variable information may be entered using a device, such as a stamp (e.g., a rubber stamp that may be set for stamping a selected number, date and/or time) that prints machine readable information (e.g., an optical code such as a DataGlyph™ or a barcode) in which the variable information is encoded. The variable information to be provided by the device may be updated manually by a human operator or may be updated automatically, such as by a digital clock. The device may be human operated (e.g., a handheld stamp) or automatically operated for stamping the form. It may be necessary to enter the variable information on the form (e.g., stamp the form) in a predetermined location on the form. After modification by a human operator the form is scanned in by a scanner of the HID 106. The scanned in information is provided by the HID 106 to the human interface module 114, which interprets the form by looking for information in predetermined locations, including interpreting the entered user input information, including any entered variable information.

The form may be provided with supplementary information that is to be associated with a product of the workflow, where the supplementary information may not be needed for the workflow, but is useful for other applications or processes involving the product of the workflow, such as shipping, tracking and/or taking inventory of the product. For example, the form may include one or more labels, such as a shipping label having a printed human readable shipping address and/or a barcode label having a printed machine readable barcode. The labels may be ready for removal from the form and affixing to the product, such as having perforations, and/or having a gummed or other adhesive backing. In a print workflow where the workflow process outputs paper products, paper job requests advantageously may be produced on the same machinery as is used for performing jobs of the workflow. The paper job requests provided may serve the dual purpose of providing paper labels for products of the workflow.

The form may include human readable instructions instructing a human operator to remove a gummed shipping label from the form and attach it to a product of the workflow. For example, a product of the workflow may include documents to be shipped in a package. The package (e.g., a box or an envelope) may be produced and/or packed by the machines of the workshop equipment 104, or a human operator may be instructed to pack the package as part of the workflow. The human operator removes a gummed shipping label from the form as per instructions provided on the form, affixes the shipping label to the package, and sends the package for shipping.

As described above, the human interface module 114 extracts the user input information from the modified output 108. The human interface module 114 provides the extracted user input information to the workflow module 112, which may include integrating the user input information with the electronic data forming the electronic job request and/or updating the electronic workflow, e.g., a JDF process tree of the electronic workflow, with the extracted user input information.

Figure 2:
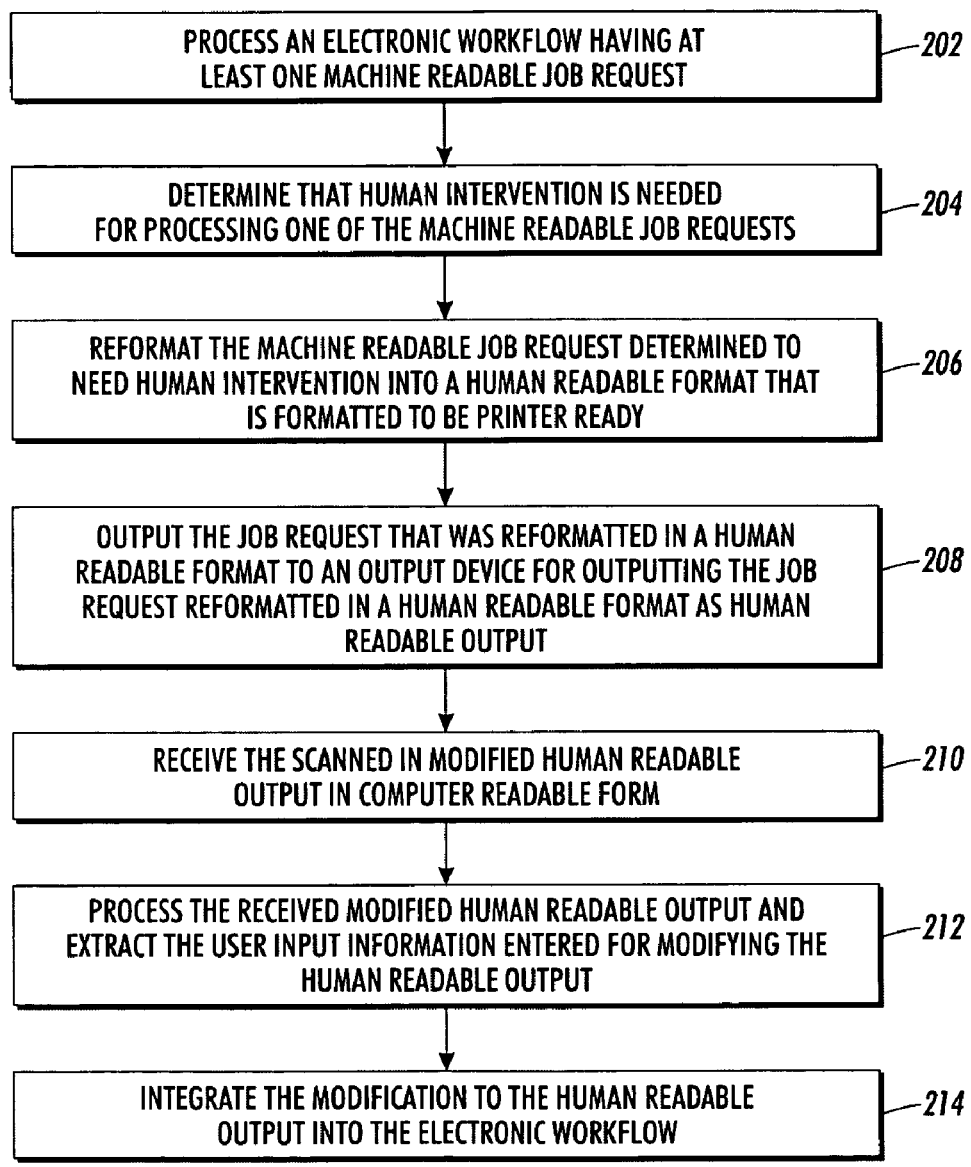
FIG. 2 is a flowchart of steps of a process performed by a workflow server of the workflow production system shown in FIG. 1.

With respect to FIG. 2, steps of a process performed by the workflow server 102 for generating and processing a modifiable paper job request are shown. The steps are performed by the workflow module 112 and the human interface module 114, including sub-modules thereof. At step 202, an electronic workflow having at least one machine readable job request is processed, which may include generating the electronic workflow. At step 204, a determination is made that human intervention is needed for processing one of the machine readable job requests. At step 206, the machine readable job request determined to need human intervention is reformatted into a human readable format that is formatted to be printer ready, including human readable information that is modifiable via user input information entered by a human operator.

At step 208, the job request that was reformatted (which may include converted) in a human readable format is output to an output device for outputting the job request reformatted in a human readable format as human readable output. The reformatted job request is printed and output to a human operator as output 108. Output 108 may include a hybrid form having machine readable optical codes indicating how the form is to be interpreted, human readable text and marked locations for a human operator to mark appropriately. The human operator reads the paper output 108, performs one or more processes prescribed by the output 108 and modifies the output 108 appropriately in accordance with the human operator's actions by entering user input information independently from the workshop equipment. Such modifications may include checking off a box provided on the hybrid form for each of the processes performed. The modified form is scanned in and converted into an electronic machine readable format.

At step 210, the modified human readable output in computer readable form is received from the scanner of the HID 114 after it was modified by the operator. At step 212, the received human readable output is processed and the user input information entered for modifying the form is extracted. For a modified hybrid form, the extracting may include interpreting the information on the modified form as specified by optical machine readable codes on the hybrid form. Variable information of the user input information entered as machine readable code is interpreted. At step 214, the modification to the human readable output is integrated into the electronic workflow, such as for updating the electronic workflow with feedback information provided by the operator.

The above described system and method provides a cost effective way to electronically process a workflow, even when not all machinery of the workflow equipment 104 is capable of processing electronic job requests. Additionally, the above described system and method preserves the use of paper in a workflow, even a when the workflow is being controlled electronically, for reaping the benefits of having paper artifact documenting the workflow, particularly for print workflows. Advantages of providing a paper artifact include providing a convenient medium for capturing workflow instructions, for providing a paper artifact that can be moved with a product of the workflow for recording progress and status of the workflow and parameters of jobs of the workflow, and for providing supplemental artifacts (e.g., labels). In the print shop realm, the paper job request provides the ability to negotiate requirements with a customer away from a computer, capturing parameters of the customer's request on paper so that the parameters are visible to the customer and print shop operator. The paper job request further provides a physical record of the activities that the operator has performed when carrying out the workflow.

It will be appreciated that various of the above-disclosed and other features and functions, or alternatives thereof, may be desirably combined into many other different systems or applications. The claims can encompass embodiments in hardware, software, or a combination thereof. Also that various presently unforeseen or unanticipated alternatives, modifications, variations or improvements therein may be subsequently made by those skilled in the art which are also intended to be encompassed by the following claims.

The invention claimed is:

1. A method for processing an electronic workflow for implementation by at least one machine, the method comprising:

processing by a workflow server having a tangible processor executing software instructions an electronic workflow having at least one machine readable job request requesting respective machines of the at least one machine to perform at least one job, wherein the job request includes at least one instruction for producing a printout of data and performance of the at least one job includes producing a printout of the data in accordance with the instructions;

recognizing by the workflow server when a machine of the at least one machine requested to perform a job of the at least one job requires human intervention to perform the requested job;

reformatting by the workflow server the machine readable job request into a human readable format for communicating the determined human intervention needed, including converting the machine readable job request including the at least one instruction into a printer ready formatted job request including human readable characters;

providing by the workflow server the printer ready reformatted job request to a printing device for printing it;

receiving by the workflow server a digital version of the printed and reformatted job request after the printed and reformatted job request was modified by a user independently of the at least one machine;

recognizing by the workflow server the modification to the printed and reformatted job request; and integrating by the workflow server the modification to the printed and reformatted job request into the electronic workflow.

2. The method according to claim 1:
wherein the reformatting includes converting the machine readable job request into a displayable formatted job request including human readable characters; and;
wherein the human readable output is displayed.

3. The method according to claim 1, wherein the at least one machine includes at least one printer;
wherein the at least one job includes at least one of setting up and operating the at least one machine; and
wherein the recognizing is based on feedback information provided by the at least one machine.

4. The method according to claim 1, wherein the providing the reformatted job request for printing includes providing for printing a printable artifact that supplements the printout of the data together with the reformatted job request so that the printed artifact is included with the printed reformatted job request.

5. A print workflow server for processing an electronic print workflow for implementation by at least one machine, the print workflow server comprising:
a tangible processor assembly for executing application software for processing the electronic print workflow having at least one machine readable job request requesting respective machines of the at least one machine to perform at least one job, wherein the job request includes at least one instruction for producing a printout of data and performance of the at least one job includes producing a printout of the data in accordance with the instructions;
a module executable by the processor assembly for recognizing when a machine of the at least one machine requested to perform a job of the at least one job requires human intervention to perform the requested job;
a module executable by the processor assembly for reformatting the machine readable job request into a human readable format for communicating the determined human intervention needed, wherein the reformatting includes converting the machine readable job request including the at least one instruction into a printer ready formatted job request including human readable characters;
a module executable by the processor assembly for providing the printer ready job request to a printer device for printing it;

a module executable by the processor assembly for receiving a digital version of the printed and reformatted job request after the printed and reformatted job request was modified by a user independently of the at least one machine;
a module executable by the processor assembly for recognizing by the processor assembly the modification to the printed and reformatted job request; and
a module executable by the processor assembly for integrating the modification to the printed and reformatted job request into the electronic print workflow.

6. The print workflow server according to claim 5:
wherein the module for reformatting includes a module executable on the processor assembly for converting the machine readable job request into a displayable formatted job request including human readable characters; and
wherein the human readable output is displayed.

7. The print workflow server according to claim 5, wherein the at least one machine includes at least one printer.

8. The print workflow server according to claim 7, wherein the human readable output is printed on the at least one printer;
wherein the at least one job includes at least one of setting up and operating the at least one machine; and
wherein the recognizing is based on feedback information provided by the at least one machine.

9. The print workflow server according to claim 5, wherein the module for providing the reformatted job request for printing includes providing for printing a printable artifact that supplements the printout of the data together with the reformatted job request so that the printed artifact is included with the printed reformatted job request.

10. A method for processing an electronic workflow for implementation by at least one machine, the method comprising:
processing by a tangible processing device executing software instructions an electronic workflow having a machine readable job request including at least one instruction for producing a printout of data for requesting respective machines of the at least one machine to perform at least one job including producing a printout of the data in accordance with the instructions;
reformatting by the tangible processing device the machine readable job request including the at least one instruction into a human readable format, including converting the machine readable job request into a printer ready formatted job request including human readable characters;
providing by the tangible processing device the job request reformatted in the human readable format to a printing device for printing the reformatted job request;
receiving by the tangible processing device a digital version of the printed and reformatted job request after the printed and reformatted job request was modified by a user independently of the at least one machine;
recognizing by the tangible processing device the modification to the printed and reformatted job request; and
integrating by the tangible processing device the modification to the printed and reformatted job request into the electronic workflow.

11. The method according to claim 10, wherein the integrating comprises:
processing the received digital version of the modified, printed, and reformatted job request; and modifying the at least one instruction of the machine readable job request of the electronic workflow with the recognized modification.

12. The method according to claim 11:
wherein the received digital version of the modified, printed, and reformatted job request further includes a machine readable code that specifies at least one location;
wherein the recognizing the user entered modification comprises:
processing the machine readable code included in the received digital version of the modified, printed, and reformatted job request for determining the specified at least one location;
finding the at least one location in the received digital version of the modified, printed, and reformatted job request; and
extracting the modifications from the found at least one location.

13. The method according to claim 10, wherein the receiving the digital version of the modified, printed, and reformatted job request includes receiving a scanned-in version of the modified, printed, and reformatted job request.

14. The method according to claim 10, further comprising recognizing by the workflow server when a machine of the at least one machine requested to perform a job of the at least one job requires human intervention to perform the requested job prior to reformatting the machine readable job request by at least one of receiving feedback information from a machine of the at least one machine, and interpreting the job request.

15. The method according to claim 10, wherein the at least one machine includes at least one printer.

16. The method according to claim 10, wherein the providing the reformatted job request for includes providing for printing a printable artifact that supplements the printout of the data with the reformatted job request so that the printed artifact is included with the printed reformatted job request.

17. The method according to claim 10, wherein a modification to the received, modified, printed, and reformatted job request includes a machine readable optical code, and the method further comprises decoding by the tangible processing device the machine readable optical code of the received, modified, printed, and reformatted job request.

* * * * *